(12) United States Patent
Christie et al.

(10) Patent No.: US 12,448,324 B2
(45) Date of Patent: Oct. 21, 2025

(54) POROUS GLASS CONTAINERS AND METHODS FOR MAKING THE SAME

(71) Applicant: CORNING INCORPORATED, Corning, NY (US)

(72) Inventors: Dane Alphanso Christie, Painted Post, NY (US); Adam Robert Sarafian, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 636 days.

(21) Appl. No.: 17/871,431

(22) Filed: Jul. 22, 2022

(65) Prior Publication Data

US 2023/0046576 A1 Feb. 16, 2023

Related U.S. Application Data

(60) Provisional application No. 63/203,581, filed on Jul. 27, 2021.

(51) Int. Cl.
*A61J 1/14* (2023.01)
*A61J 1/00* (2023.01)
(Continued)

(52) U.S. Cl.
CPC ............... *C03C 11/005* (2013.01); *A61J 1/00* (2013.01); *A61J 1/1468* (2015.05); *C03C 3/072* (2013.01); *C03C 3/089* (2013.01); *C03C 3/091* (2013.01); *C03C 3/097* (2013.01); *C03C 15/00* (2013.01); *C03C 17/005* (2013.01); *C03C 17/32* (2013.01); *C03C 23/007* (2013.01); *C03C 23/008* (2013.01); *C03C 2203/52* (2013.01); *C03C 2217/78* (2013.01)

(58) Field of Classification Search
CPC .................................. C03C 15/00; B65D 1/40
See application file for complete search history.

(56) References Cited

U.S. PATENT DOCUMENTS 3,967,995 A  7/1976 Fabianic
8,978,414 B2  3/2015 Bookbinder et al.
(Continued)

FOREIGN PATENT DOCUMENTS

EP  3102173 B1    4/2019
EP  3189017 B1 * 11/2022 ............. C03C 15/00
(Continued)

OTHER PUBLICATIONS

Dauskardt et al., "Synthesis of Polyimides in Molecular-Scale Confinement for Low-Density Hybrid Nanocomposites", Nano letters, vol. 17(11), 2017, pp. 7040-7044.
(Continued)

*Primary Examiner* — Cachet I Proctor
(74) *Attorney, Agent, or Firm* — Michael G. Panian

(57) ABSTRACT

A glass container includes a glass body comprising an external surface, an internal surface opposite the external surface, a thickness T extending between the external surface and the internal surface, and an external surface layer extending from the external surface into the thickness of the glass body, wherein the external surface layer has a porosity greater than a porosity of a remainder of the glass body extending from the external surface layer to the internal surface.

10 Claims, 8 Drawing Sheets

(51) Int. Cl.
    *B65D 1/40*     (2006.01)
    *C03C 3/072*     (2006.01)
    *C03C 3/089*     (2006.01)
    *C03C 3/091*     (2006.01)
    *C03C 3/097*     (2006.01)
    *C03C 11/00*     (2006.01)
    *C03C 15/00*     (2006.01)
    *C03C 17/00*     (2006.01)
    *C03C 17/32*     (2006.01)
    *C03C 23/00*     (2006.01)

(56) References Cited

U.S. PATENT DOCUMENTS

| | | | |
|---|---|---|---|
| 10,316,155 | B2 | 6/2019 | Cho et al. |
| 10,384,972 | B2 | 8/2019 | Xu et al. |
| 10,737,973 | B2 | 8/2020 | Bayne et al. |
| 2011/0104439 | A1* | 5/2011 | Choi ................ C03C 17/30 428/161 |
| 2012/0088066 | A1* | 4/2012 | Aytug ................ C03C 17/02 216/37 |
| 2014/0150499 | A1* | 6/2014 | Danielson ............ B65D 25/34 65/31 |
| 2015/0218047 | A1 | 8/2015 | Xu et al. |
| 2017/0320773 | A1 | 11/2017 | Bookbinder et al. |
| 2017/0355632 | A1* | 12/2017 | McEnroe ................ B32B 1/08 |
| 2019/0112216 | A1* | 4/2019 | Otosaka ............ C03B 37/0142 |
| 2020/0156995 | A1 | 5/2020 | Gross et al. |
| 2020/0156996 | A1 | 5/2020 | Gross et al. |
| 2020/0156997 | A1 | 5/2020 | Gross et al. |
| 2021/0331967 | A1* | 10/2021 | Simpson ................ C23C 14/10 |

FOREIGN PATENT DOCUMENTS

| | | | | | |
|---|---|---|---|---|---|
| JP | 2003128439 | A | * | 5/2003 | ............ G06F 3/041 |
| JP | 2015061808 | A | * | 4/2015 | ............ G06F 3/041 |
| JP | 2020147500 | A | * | 9/2020 | ............ C03B 23/04 |
| KR | 10-2015-0086956 | A | | 7/2015 | |
| KR | 10-2016-0119443 | A | | 10/2016 | |
| WO | 2013/105165 | A1 | | 7/2013 | |

OTHER PUBLICATIONS

International Search Report and Written Opinion of the International Searching Authority; PCT/US2022/037044; dated Oct. 21, 2022; 10 pages; European Patent Office.

Kisilev et al., "Metastable liquid immiscibility and Vycor-type glass in phosphate-silicate systems", Journal of Materials Science, vol. 15(8), 1980, pp. 2027-2038.

Schwarzenbach et al., "Interferon a-2a interactions on Glass Vial Surfaces Measured by Atomic Force Microscopy", PDA J. Pharmaceutical Science and Technology, vol. 56, No. 2, Mar.-Apr. 2002, pp. 78-89.

Shelby, "Introduction to Glass Science and Technology", Royal Society of Chemistry, Jan. 1, 2005—Technology & Engineering, p. 193.

Yamane et al., "Preparation of porous glass-ceramics of the TiO 2-SiO 2 system", Journal of materials science, 1985, vol. 20(12), pp. 4309-4316.

Yamane et al., "The stability of mother glass for porous glass-ceramics of the TiO 2-SiO 2 system", Journal of materials science, vol. 23(7), 1988, pp. 2449-2456.

Yang et al., "Rod-like attapulgite/polyimide nanocomposites with simultaneously improved strength, toughness, thermal stability and related mechanisms", Journal of Materials Chemistry, vol. 18(41), 2008, pp. 4928-4941.

* cited by examiner

POROUS GLASS CONTAINERS AND METHODS FOR MAKING THE SAME

CROSS-REFERENCE TO RELATED APPLICATIONS

This application claims the benefit of priority under 35 U.S.C. § 119 of U.S. Provisional Application Ser. No. 63/203,581 filed on Jul. 27, 2021, the content of which is relied upon and incorporated herein by reference in its entirety.

FIELD

The present specification generally relates to glass containers and, in particular, to porous glass containers.

TECHNICAL BACKGROUND

Glass is commonly employed in a variety of commercial and consumer applications due to its unique properties relative to other types of materials. For example, the relative inertness of glass, at least compared to polymeric materials, makes glass well suited for use in packaging consumables, such as food stuffs or pharmaceuticals, which can interact with the packaging materials. Likewise, the relative hardness or scratch resistance of glass, at least compared to polymeric materials, makes glass well suited for use as cover glasses in electronic devices such as LCD and LED displays, computer monitors, automated teller machines (ATMs), and the like.

Glass articles used in the aforementioned consumer and commercial applications must be sufficiently robust to endure regular contact without damage or failure. Strengthening processes, such as thermal and chemical tempering, may be used to strengthen glass articles. However, these tempering techniques may not prevent certain types of damage, such as scratches, which may occur during manufacturing, shipping, and handling.

Accordingly, a need exists for alternative articles, such as glass containers or the like, having improved resistance to mechanical damage.

SUMMARY

According to a first aspect A1, a glass container may comprise: a glass body comprising an external surface, an internal surface opposite the external surface, a thickness T extending between the external surface and the internal surface, and an external surface layer extending from the external surface into the thickness of the glass body, wherein the external surface layer has a porosity greater than a porosity of a remainder of the glass body extending from the external surface layer to the internal surface.

A second aspect A2 includes the glass container according to the first aspect A1, wherein the external surface layer extends greater than or equal to 10 nm and less than or equal to 100 nm from the external surface into the thickness of the glass body.

A third aspect A3 includes the glass container according to the first aspect A1 or second aspect A2, wherein the external surface layer has a porosity greater than 30% and less than or equal to 50%.

A fourth aspect A4 includes the glass container according to any one of the first through third aspects A1-A3, wherein the remainder of the glass body has a porosity greater than or equal to 0% and less than or equal to 30%.

A fifth aspect A5 includes the glass container according to the fourth aspect A4, wherein the porosity of the remainder of the glass body is 0%.

A sixth aspect A6 includes the glass container according to any one of the first through fifth aspects A1-A5, wherein the external surface layer comprises pores having a pore size greater than or equal to 10 nm and less than or equal to 20 nm.

A seventh aspect A7 includes the glass container according to any one of the first through sixth aspects A1-A6, wherein the remainder of the glass body comprises pores having a pore size less than 10 nm.

An eighth aspect A8 includes the glass container according to the seventh aspect A7, wherein the pores of the remainder of the glass body have a pore size less than or equal to 5 nm.

A ninth aspect A9 includes the glass container according to any one of the first through eighth aspects A1-A8, wherein the remainder of the glass body is fully consolidated.

A tenth aspect A10 includes the glass container according to any one of the first through ninth aspects A1-A9, wherein the glass body comprises greater than or equal to 25 mol % $SiO_2$.

An eleventh aspect A11 includes the glass container according to any one of the first through tenth aspects A1-A10, wherein the glass container is a coated glass container comprising a polymer disposed in pores of the external surface layer of the glass body.

A twelfth aspect A12 includes a glass container according to the eleventh aspect A11, wherein the polymer is also disposed on the external surface of the glass body.

A thirteenth aspect A13 includes a glass container according to the eleventh aspect A11 or twelfth aspect A12, wherein the polymer has a coefficient of friction less than or equal to 0.7.

A fourteenth aspect A14 includes a glass container according to any one of the first through thirteenth aspects A1-A13, wherein the glass container is a pharmaceutical package.

According to a fifteenth aspect A15 the method of forming a glass container may comprise: providing a glass container having a glass body comprising an external surface, an internal surface opposite the external surface, a thickness T extending between the external surface and the internal surface, and an external surface layer extending from the external surface into the thickness of the glass body; contacting the external surface of the glass body with a first etchant and preventing contact between the internal surface of the glass body and the etchant to produce the glass container having the step porosity, wherein the external surface layer has a porosity greater than a porosity of a remainder of the glass body extending from the external surface layer to the internal surface.

A sixteenth aspect A16 includes the method according to the fifteenth aspect A15, wherein the method further comprises heating the etched glass container to at least partially consolidate pores in at least the remainder of the glass body.

A seventeenth aspect A17 includes the method according to the sixteenth aspect A16, wherein the heating the etched glass container comprises: heating the etched glass container at a first average heating rate greater than or equal to 50° C./hour and less than or equal to 150° C./hour to a first temperature range greater than or equal to 200° C. and less than or equal to 300° C.; heating the etched glass container at a second average heating rate greater than or equal to 150° C./hour and less than or equal to 250° C./hour to a second temperature range greater than or equal to 1150° C. and less than or equal to 1300° C.; holding the etched glass container at the second temperature range for a time period greater than or equal to 0.1 hour and less than or equal to 0.5 hour such that the pores in at least the remainder of the glass body are at least partially consolidated; and cooling the partially consolidated glass container to room temperature.

An eighteenth aspect A18 includes the method according to the sixteenth aspect A16 or seventeenth aspect A17, wherein pores in the external surface layer of the glass body are masked prior to the heating the etched glass container.

A nineteenth aspect A19 includes the method according to the eighteenth aspect A18, wherein the pores in the external surface layer of the glass body are masked with graphite, poly(vinyl chloride), poly(vinyl alcohol), poly(vinyl pyrrolidone), alkali halide salts, or a combination thereof.

A twentieth aspect A20 includes the method according to any one of the sixteenth through nineteenth aspects A16-A19, wherein the method further includes coating the partially consolidated glass container with a coating, the coating having a coefficient of friction less than or equal to 0.7.

A twenty-first aspect A21 includes the method according to any one of the fifteenth through twentieth aspects A15-A20, wherein the glass container is formed from an alkali borosilicate glass composition.

A twenty-second aspect A22 includes the method according to the twenty-first aspect A21, wherein the method further comprises, prior to the contacting with the etchant, heating the glass container to separate the alkali borosilicate glass composition into a boric oxide-rich phase and a silica-rich phase.

A twenty-third aspect A23 includes the method according to any one of the fifteenth through twenty-second aspects A15-A22, wherein the first etchant is a substantially fluoride-free aqueous acidic treating medium.

A twenty-fourth aspect A24 includes the method according to any one of the fifteenth through twenty-third aspects A15-A23, wherein the contacting with the first etchant is conducted at a temperature greater than or equal to 20° C. and less than or equal to 125° C. and for a time period greater than or equal to 0.1 hour and less than or equal to 1 hour.

A twenty-fifth aspect A25 includes the method according to any one of the fifteenth through twenty-fourth aspects A15-A24, wherein the method further includes contacting the external surface of the glass body with a second etchant at a temperature greater than or equal to 75° C. and less than or equal to 125° C. and for a time period greater than or equal to 16 hours and less than or equal to 48 hours.

A twenty-sixth aspect A26 includes the method according to any one of the fifteenth through twenty-fifth aspects A15-A25, wherein the method further includes rinsing the etched glass container in a solution at a temperature greater than or equal to 75° C. and less than or equal to 125° C. and for a time period greater than or equal to 12 hours and less than or equal to 24 hours and rinsing the etched glass container in water at a temperature greater than or equal to 75° C. and less than or equal to 125° C. and for a time period greater than or equal to 12 hours and less than or equal to 24 hours.

Additional features and advantages of the porous glass containers described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
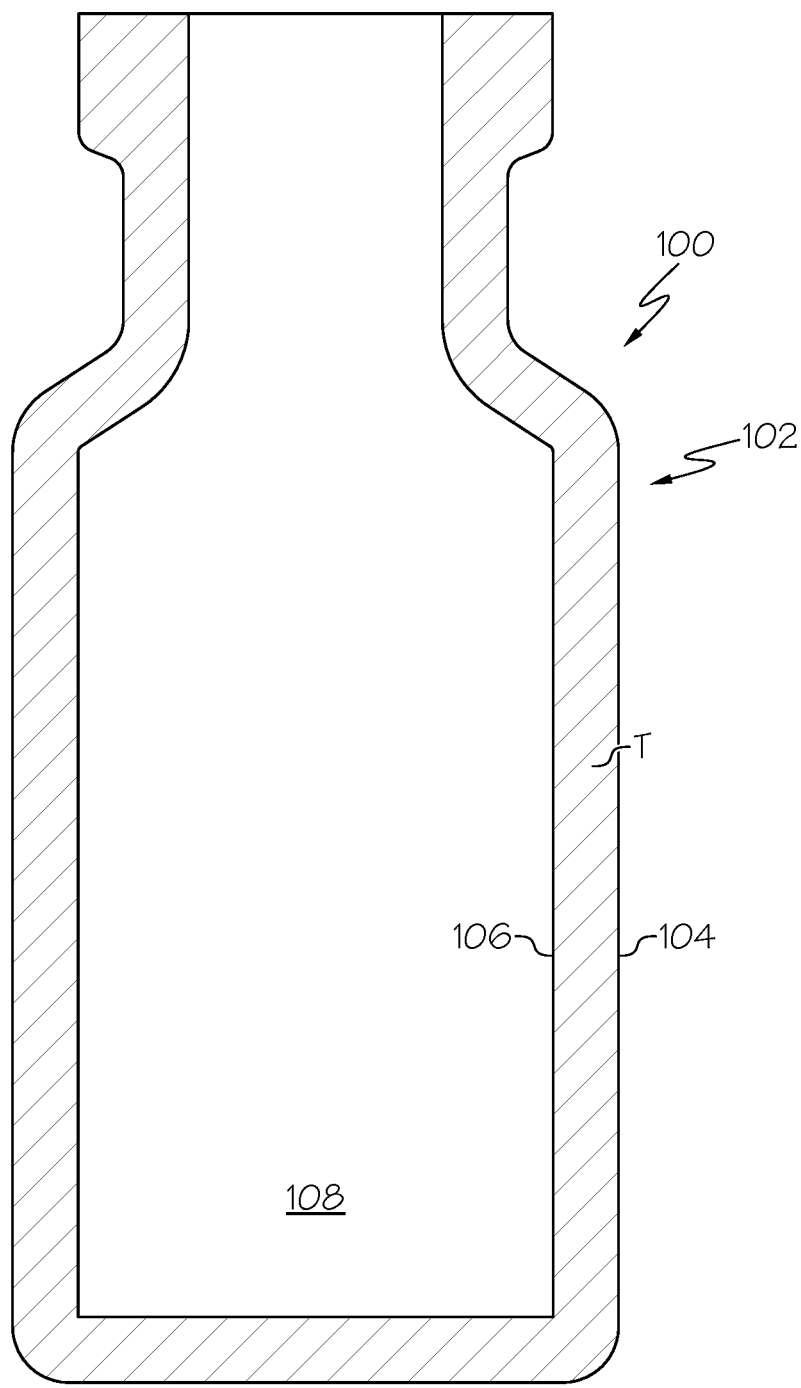
FIG. 1 is a schematic, cross-sectional view of a glass container, according to one or more embodiments shown and described herein.

Reference will now be made in detail to various embodiments of porous glass articles, such as glass containers, having a desired porosity and methods of making the same. A glass container includes a glass body comprising an external surface, an internal surface opposite the external surface, a thickness T extending between the external surface and the internal surface, and an external surface layer extending from the external surface into the thickness of the glass body, wherein the external surface layer has a porosity greater than a porosity of a remainder of the glass body extending from the external surface layer to the internal surface. Various embodiments of porous glass containers and methods of making the same will be described herein with specific reference to the appended drawings.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

In the embodiments of lass compositions described herein, the concentrations of constituent components in oxide form (e.g., $SiO_2$, $Al_2O_3$, and the like) are specified in mole percent (mol %) on an oxide basis, unless otherwise specified.

The terms "0 mol %," "free," and "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.01 mol %.

The viscosity of the glass compositions, as described herein, is measured according to ASTM C965-96.

The term "melting point," as used herein, refers to the temperature at which the viscosity of the glass composition is 200 poise.

The term "softening point," as used herein, refers to the temperature at which the viscosity of the glass composition is $1\times10^{7.6}$ poise. The softening point is measured according to the parallel plate viscosity method which measures the viscosity of inorganic glass from $10^7$ to $10^9$ poise as a function of temperature, similar to ASTM C1351M.

The term "strain point," as used herein, refers to the temperature at which the viscosity of the glass composition is $1\times10^{14.68}$ poise.

The term "linear coefficient of thermal expansion" and "CTE," as described herein, is measured in accordance with ASTM E228-85 over the temperature range of 25° C. to 300° C. and is expressed in terms of "$\times10^{-7}$/° C." as an average over the temperature range.

The term "phase separable glass composition," as described herein, refers to a glass composition which undergoes phase separation into two or more distinct phases upon exposure to a phase separation treatment, such as a heat treatment or the like.

The term "porosity," as described herein, refers to open porosity where the glass includes a network of interconnected pores and is measured according to ASTMD4404-10.

The term "pore size," as described herein, is the median pore size of the referenced portion of the glass container as measured via image analysis of a cross section of a sample as obtained by atomic force microscopy with a scan size of 500 nm.

The term "consolidate," as used herein, refers to a reduction in the porosity of the glass.

The term "partially consolidated," as used herein, refers to a glass or a portion thereof that has had a reduction in porosity as a result of being subjected to a thermal consolidation schedule.

The term "fully consolidated," as used herein, refers to a glass or a portion thereof that has a porosity of 0%.

The term "rich phase," as used herein, refers to a glass phase formed upon exposure to a phase separation treatment that has the listed component present in the greatest amount. For example, "a silica-rich phase" is a glass phase that has silica present in the greatest amount. In another example, "a silica-rich and titania-rich phase" is a glass phase that has silica and titania present in the greatest amount and the second greatest amount.

Historically, glass has been used as the preferred material for packaging pharmaceuticals because of its hermeticity, optical clarity, and excellent chemical durability relative to other materials. Specifically, the glass used in pharmaceutical packages must have adequate chemical durability so as not to affect the stability of the pharmaceutical compositions contained therein. Glasses having suitable chemical durability include those glass compositions within the ASTM standard "Type 1B," which have a proven history of chemical durability.

However, use of glass for such applications is limited by the mechanical performance of the glass. In the pharmaceutical industry, glass breakage is a safety concern for the end user, as the broken container and/or the contents of the container may injure the end user. Furthermore, non-catastrophic breakage (i.e., when the glass cracks but does not break) may cause the contents to lose their sterility, which, in turn, may result in costly product recalls.

Specifically, the high processing speeds utilized in the manufacture and filling of glass pharmaceutical packages may result in mechanical damage on the external surface of the container, such as abrasions, as the containers come into contact with process equipment, handling equipment, and/or other containers. This mechanical damage significantly decreases the strength of the glass pharmaceutical package resulting in an increased likelihood that cracks will develop in the glass, potentially comprising the sterility of the pharmaceutical contained in the container or causing the complete failure of the container.

One approach to improving the mechanical durability of the glass container is to thermally and/or chemically temper the glass container. Thermal tempering strengthens glass by inducing a surface compressive stress during rapid cooling after forming. This technique works well for glass articles with flat geometries (such as windows), glass articles with thicknesses greater than about 2 mm, and glass compositions with high thermal expansion. However, pharmaceutical glass packages typically have complex geometries (vial, tubular, ampoule, etc.), thin walls (sometimes between about 1-1.5 mm), and are produced from low expansion glasses, making glass pharmaceutical packages unsuitable for strengthening by conventional thermal tempering. Chemical tempering also strengthens glass by the introduction of surface compressive stress. The stress is introduced by submerging the article in a molten salt bath. As ions from the glass are replaced by larger ions from the molten salt, a compressive stress is induced in the surface of the glass. The advantage of chemical tempering is that it can be used on complex geometries, thin samples, and is relatively insensitive to the thermal expansion characteristics of the glass.

However, while these tempering techniques may improve the ability of the strengthened glass to withstand blunt impacts, these techniques are less effective in improving the resistance of the glass to abrasions, such as scratches, which may occur during manufacturing, shipping, and handling.

A coating may be applied to an external surface of a glass article, such as a glass container that may be used as a pharmaceutical package. The coating may provide advantageous properties to the coated glass container such as a reduced coefficient of friction and increased damage resistance. The reduced coefficient of friction may impart improved strength and durability to the glass container by mitigating frictive damage to the glass. Furthermore, the coating may aid in maintaining the aforementioned improved strength and durability characteristics following exposure to elevated temperatures and other conditions, such as those experienced during packaging and pre-packaging steps utilized in packaging pharmaceuticals, such as, for example, depyrogenation, lyphilization, autoclaving, and the like.

In certain applications, it may be desirable to increase the surface area of the fully consolidated external surface of the glass article to provide more contact between the external surface and the coating Generally, glass containers are formed such that the glass is fully consolidated. However, in certain applications, it may be desirable to increase the surface area of a fully consolidated external surface to facilitate adhesion between the external surface and the coating, thereby reducing or preventing cracking, flaking, and/or peeling of the coating.

Disclosed herein are glass containers and methods of making the same that address the aforementioned needs. In particular, described herein are glass containers comprising an external surface with a desired porosity to provide increased surface area and thereby improve coating adhesion thereto. Methods of making such glass containers are also disclosed.

Referring now to FIG. 1, a glass container 100 is schematically depicted. The glass container 100 comprises a glass body 102. The glass body 102 has a thickness T extending between an external surface 104 (i.e., a first surface) and an internal surface 106 (i.e., a second surface). The internal surface 106 of the glass body 102 defines an interior volume 108 of the glass container 100.

In embodiments, the glass container 100 is a pharmaceutical package. For example, the glass body 102 may be in the shape of a vial, ampoule, bottle, flask, phial, beaker, bucket, cartridge, vat, syringe body, or the like. The glass container 100 may be used for containing any composition, and in embodiments, may be used for containing a pharmaceutical composition. A pharmaceutical composition may include any chemical substance intended for use in the medical diagnosis, cure, treatment, or prevention of disease. Examples of pharmaceutical compositions include, but are not limited to, medicines, drugs, medications, medicaments, remedies, and the like. The pharmaceutical composition may be in the form of a liquid, solid, gel, suspension, powder, or the like.

Figure 2:
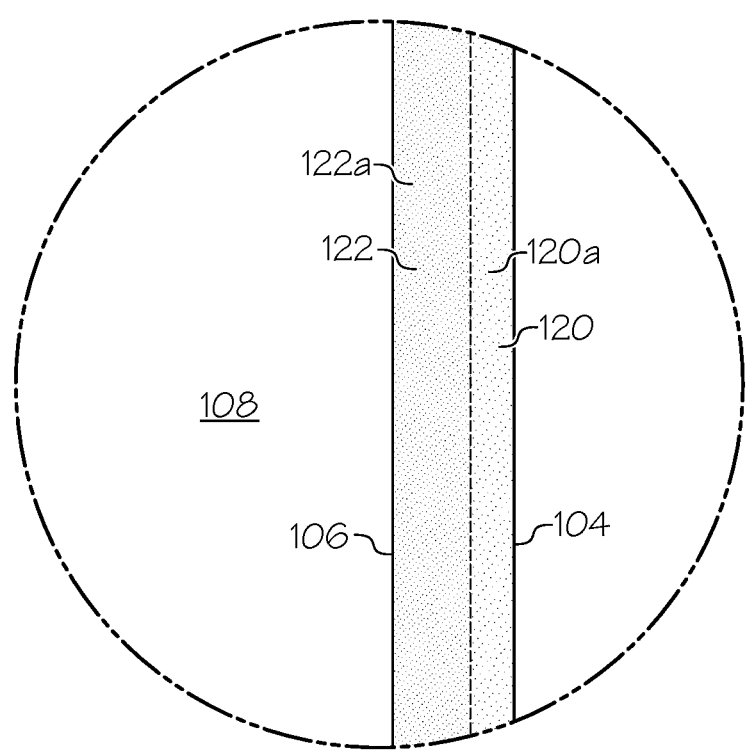
FIG. 2 is a schematic, cross-sectional, enlarged view of the glass container of FIG. 1, accordingly to one or more embodiments shown and described herein.

Referring now to FIG. 2, the glass body 102 has an external surface layer 120 extending from the external surface 104 into the thickness T of the glass body 102. In embodiments, the external surface layer 120 is contiguous and integral with the remainder 122 of the glass body 102. In embodiments, the external surface layer 120 may extend greater than or equal to 10 nm and less than or equal to 100 nm from the external surface 104 into the thickness T of the glass body 102. In embodiments, the external surface layer 120 may extend greater than or equal to 10 nm, greater than or equal to 20 nm, or even greater than or equal to 30 nm from the external surface 104 into the thickness T of the glass body 102. In embodiments, the external surface layer 120 may extend less than or equal to 100 nm, less than or equal to 80 nm, or even less than or equal to 60 nm from the external surface 104 into the thickness T of the glass body 102. In embodiments, the external surface layer 120 may extend greater than or equal to 10 nm and less than or equal to 100 nm, greater than or equal to 10 nm and less than or equal to 80 nm, greater than or equal to 10 nm and less than or equal to 60 nm, greater than or equal to 20 nm and less than or equal to 100 nm, greater than or equal to 20 nm and less than or equal to 80 nm, greater than or equal to 20 nm and less than or equal to 60 nm, greater than or equal to 30 nm and less than or equal to 100 nm, greater than or equal to 30 nm and less than or equal to 80 nm, or even greater than or equal to 30 nm and less than or equal to 60 nm, or any and all sub-ranges formed from any of these endpoints, from the external surface 104 into the thickness T of the glass body 102.

The external surface layer 120 has a porosity greater than a porosity of a remainder 122 of the glass body 102 extending from the external surface layer 120 to the internal surface 106. This relatively greater porosity of the external surface layer 120 facilitates adherence of the coating to the external surface 104, thereby reducing or eliminating cracking, flaking, and/or peeling of the coating.

In embodiments, the external surface layer 120 may have a porosity greater than or equal to 30% and less than or equal to 50% to facilitate adherence of the coating to the glass container. The coating may penetrate into the porosity of the external surface layer 120, thereby improving adhesion. In embodiments, the porosity of the external surface layer 120 may be greater than 30%, greater than or equal to 33%, or even greater than or equal to 35%. In embodiments, the porosity of the external surface layer 120 may be less than or equal to 50%, less than or equal to 45%, or even less than or equal to 40%. In embodiments, the porosity of the external surface layer 120 may be greater than 30% and less than or equal to 50%, greater than 30% and less than or equal to 45%, greater than 30% and less than or equal to 40%, greater than or equal to 33% and less than or equal to 50%, greater than or equal to 33% and less than or equal to 45%, greater than or equal to 33% and less than or equal to 40%, greater than or equal to 35% and less than or equal to 50%, greater than or equal to 35% and less than or equal to 45%, or even greater than or equal to 35% and less than or equal to 40%, or any and all sub-ranges formed form any of these endpoints.

In embodiments, the remainder 122 of the glass body 102 may have a porosity less than that of the external surface layer 120. In embodiments, the porosity of the remainder 122 of the glass body 102 is greater than or equal to 0% and less than or equal to 30%. In embodiments, the porosity of the remainder 122 of the glass body 102 may be greater than or equal to 0%, greater than or equal to 3%, or even greater than or equal to 5%. In embodiments, the porosity of the remainder 122 of the glass body 102 may be less than or equal to 30%, less than or equal to 20%, or even less than or equal to 10%. In embodiments, the porosity of the remainder 122 of the glass body 102 may be greater than or equal to 0% and less than or equal to 30%, greater than or equal to 0% and less than or equal to 20%, greater than or equal to 0% and less than or equal to 10%, greater than or equal to 3% and less than or equal to 30%, greater than or equal to 3% and less than or equal to 20%, greater than or equal to 3% and less than or equal to 10%, greater than or equal to 5% and less than or equal to 30%, greater than or equal to 5% and less than or equal to 20%, or even greater than or equal to 5% and less than or equal to 10%, or any and all sub-ranges formed from any of these endpoints. In embodiments, the porosity of the remainder 122 of the glass body 102 is 0%.

In embodiments, the external surface layer 120 may have pores 120a having a pore size greater than or equal to 10 nm and less than or equal to 20 nm to facilitate adherence of the coating to the glass container. In embodiments, the external surface layer 120 may have pores 120a having a pore size greater than or equal to 10 nm or even greater than or equal to 13 nm. In embodiments, the external surface layer 120 may have pores 120a having a pore size less than or equal to 20 nm, less than or equal to 17 nm, or even less than or equal to 15 nm. In embodiments, the external surface layer 120 may have pores 120a having a pore size greater than or equal to 10 nm and less than or equal to 20 nm, greater than or equal to 10 nm and less than or equal to 17 nm, greater than or equal to 10 nm and less than or equal to 15 nm, greater than or equal to 13 nm and less than or equal to 20 nm, greater than or equal to 13 nm and less than or equal to 17 nm, or even greater than or equal to 13 nm and less than or equal to 15 nm, or any and all sub-ranges formed from any of these endpoints.

In embodiments, the remainder 122 of the glass body 102 may have pores 122a having a pore size less than 10 nm. In embodiments, the remainder 122 of the glass body 102 may have pores 122a having a pore size less than or equal to 5 nm. In embodiments, the remainder 122 of the glass body 102 may have pores having a pore size less than 10 nm, less than or equal to 5 nm, or even less than or equal to 3 nm. In embodiments, the remainder 122 of the glass body 102 may have pores 122a having a pore size greater than 0 nm, greater than or equal to 0.5 nm, or even greater than or equal to 1 nm. In embodiments, the remainder 122 of the glass body 102 may have pores 122a having a pore size greater than 0 nm and less than 10 nm, greater than 0 nm and less than or equal to 5 nm, greater than 0 nm and less than or equal to 3 nm, greater than or equal to 0.5 nm and less than 10 nm, greater than or equal to 0.5 nm and less than or equal to 5 nm, greater than or equal to 0.5 nm and less than or equal to 3 nm, greater than or equal to 1 nm and less than 10 nm, greater than or equal to 1 nm and less than or equal to 5 nm, or even greater than or equal to 1 nm and less than or equal to 3 nm, or any and all sub-ranges formed from any of these endpoints. In embodiments, the remainder 122 of the glass body 102 is fully consolidated (i.e., does not have any pores).

In embodiments of the glass containers described herein, the glass container may be phase separated into a first glass phase and at least one second glass phase during processing, with each of the glass phases having different compositions. Accordingly, it should be understood that the glass containers are formed from a glass composition which is susceptible to phase separation upon exposure to a phase separation treatment (i.e., the glass composition is a "phase separable" glass composition). In embodiments, the glass container may include an interconnected matrix of glass formed from the first glass phase with the second glass phase dispersed throughout the interconnected matrix of the first glass phase. In these embodiments, the second glass phase is itself interconnected within the interconnected matrix of the first glass phase. In embodiments, the first glass phase and the second glass phase may have different dissolution rates in water, basic solutions, and/or acidic solutions. For example, the at least one second glass phase present in the phase separated glass container may more readily dissolve in water and/or acidic solution than the first glass phase. Alternatively, the first glass phase present in the in the phase separated glass container may more readily dissolve in water and/or acidic solutions than the at least one second glass phase. This characteristic enables either the first glass phase or the second glass phase to be selectively removed from the glass container such that the remaining glass container is a porous, interconnected matrix formed from the remaining phase of the phase separated glass composition. In embodiments, the first glass phase may be a silica-rich phase or a silica-rich and a titantia-rich phase. In embodiments, the second glass phase may be a boric oxide-rich phase, a phosphorous oxide-rich phase, a calcium oxide-rich phase, or combinations thereof. In embodiments, the first glass phase may be a silica-rich phase and the second glass phase may be a boric oxide-rich phase. In embodiments, the first glass phase may be a silica-rich phase and the second glass phase may be a phosphorous oxide-rich phase. In embodiments, the first glass phase may be a silica-rich and titania-rich phase and the second glass phase may be a calcium oxide-rich and a boric oxide-rich phase. In embodiments, the silica-rich phase may include less than or equal to 5 wt % of other glass components (e.g., calcium oxide, boric oxide, and/or phosphorous oxide) besides silica. In embodiments, the amount of other glass components in the silica-rich phase may be controlled via the phase separation treatment temperature and time.

The phase separable glass compositions used to form the glass containers described herein may be described as silicate glass compositions and comprise $SiO_2$. In embodiments, the glass composition may be an alkali borosilicate glass composition and comprise $SiO_2$, $B_2O_3$, and $R_2O$ (e.g., $Na_2O$, $Li_2O$, $K_2O$, $Rb_2O$, and/or $Cs_2O$). In embodiments, in addition to or as an alternative to $B_2O_3$, the glass compositions may comprise $P_2O_5$ and/or $TiO_2$.

$SiO_2$ is the primary glass former in the glass compositions described herein and may function to stabilize the network structure of the glass containers. The concentration of $SiO_2$ in the glass compositions should be sufficiently high (e.g., greater than or equal to 25 mol %) to provide basic glass forming capability. The concentration of $SiO_2$ may be limited (e.g., less than or equal to 80 mol %) to control the melting point of the glass composition, as the melting temperature of pure $SiO_2$ or high $SiO_2$ glasses is undesirably high. Thus, limiting the concentration of $SiO_2$ may aid in improving the meltability and the formability of the resulting glass container.

Accordingly, in embodiments, the glass composition may comprise greater than or equal to 25 mol % $SiO_2$. In embodiments, the concentration of $SiO_2$ in the glass composition may be greater than or equal 25 mol %, greater than or equal to 35 mol %, greater than or equal to 45 mol %, or even greater than or equal to 55 mol %. In embodiments, the concentration of $SiO_2$ in the glass composition may be less than or equal to 80 mol %, less than or equal to 75 mol %, less than or equal to 70 mol %, or even less than or equal to 65 mol %. In embodiments, the concentration of $SiO_2$ in the glass composition may be greater than or equal 25 mol % and less than or equal to 80 mol %, greater than or equal 25 mol % and less than or equal to 75 mol %, greater than or equal 25 mol % and less than or equal to 70 mol %, greater than or equal 25 mol % and less than or equal to 65 mol %, greater than or equal 35 mol % and less than or equal to 80 mol %, greater than or equal 35 mol % and less than or equal to 75 mol %, greater than or equal 35 mol % and less than or equal to 70 mol %, greater than or equal 35 mol % and less than or equal to 65 mol %, greater than or equal 45 mol % and less than or equal to 80 mol %, greater than or equal 45 mol % and less than or equal to 75 mol %, greater than or equal 45 mol % and less than or equal to 70 mol %, greater than or equal 45 mol % and less than or equal to 65 mol %, greater than or equal 55 mol % and less than or equal to 80 mol %, greater than or equal 55 mol % and less than or equal to 75 mol %, greater than or equal 55 mol % and less than or equal to 70 mol %, or even greater than or equal 55 mol % and less than or equal to 65 mol %, or any and all sub-ranges formed from any of these endpoints.

In embodiments, the glass composition may comprise $Al_2O_3$. Like $SiO_2$, $Al_2O_3$ may also stabilize the glass network and additionally provides improved mechanical properties and chemical durability to the glass compositions. The amount of $Al_2O_3$ may also be tailored to control the viscosity of the glass composition. In embodiments, the concentration of $Al_2O_3$ in the glass composition may be greater than or equal to 0 mol %, greater than or equal to 1 mol %, greater than or equal to 5 mol %, or even greater than or equal to 10 mol %. In embodiments, the concentration of $Al_2O_3$ in the glass composition may be less than or equal to 18 mol %, less than or equal to 16 mol %, or even less than or equal to 14 mol %. In embodiments, the concentration of $Al_2O_3$ in the glass composition may be greater than 0 mol % and less than or equal to 18 mol %, greater than 0 mol % and less than or equal to 16 mol %, greater than 0 mol % and less than or equal to 14 mol %, greater than 1 mol % and less than or equal to 18 mol %, greater than 1 mol % and less than or equal to 16 mol %, greater than 1 mol % and less than or equal to 14 mol %, greater than 5 mol % and less than or equal to 18 mol %, greater than 5 mol % and less than or equal to 16 mol %, greater than 5 mol % and less than or equal to 14 mol %, greater than 10 mol % and less than or equal to 18 mol %, greater than 10 mol % and less than or equal to 16 mol %, or even greater than 10 mol % and less than or equal to 14 mol %, or any and all sub-ranges formed from any of these endpoints. In embodiments, the glass composition may be free or substantially free of $Al_2O_3$.

In embodiments, the glass composition may comprise $B_2O_3$. $B_2O_3$ decreases the melting temperature of the glass composition and may improve the damage resistance of the glass compositions. In addition, the incorporation of $B_2O_3$ in the glass composition may also facilitate separating the glass composition into a silica-rich phase and a boric oxide-rich phase. In these embodiments, the silica-rich phase may be less susceptible to dissolution in water and/or an acidic solution than the boric oxide-rich phase, which, in turn, facilitates the selective removal of the boric oxide-rich phase and the formation of a porous microstructure in the glass container. In embodiments, the concentration of $B_2O_3$ in the glass composition may be greater than or equal to 0 mol %, greater than or equal to 5 mol %, greater than or equal to 10 mol %, or even greater than or equal to 15 mol %. In embodiments, the concentration of $B_2O_3$ in the glass composition may be less than or equal to 35 mol %, less than or equal to 30 mol %, or even less than or equal to 25 mol %. In embodiments, the concentration of $B_2O_3$ in the glass composition may be greater than or equal to 0 mol % and less than or equal to 35 mol %, greater than or equal to 0 mol % and less than or equal to 30 mol %, greater than or equal to 0 mol % and less than or equal to 25 mol %, greater than or equal to 5 mol % and less than or equal to 35 mol %, greater than or equal to 5 mol % and less than or equal to 30 mol %, greater than or equal to 5 mol % and less than or equal to 25 mol %, greater than or equal to 10 mol % and less than or equal to 35 mol %, greater than or equal to 10 mol % and less than or equal to 30 mol %, greater than or equal to 10 mol % and less than or equal to 25 mol %, greater than or equal to 15 mol % and less than or equal to 35 mol %, greater than or equal to 15 mol % and less than or equal to 30 mol %, or even greater than or equal to 15 mol % and less than or equal to 25 mol %, or any and all sub-ranges formed from any of these endpoints. In embodiments, the glass composition may be free or substantially free of $B_2O_3$.

In embodiments, the glass composition may comprise $Na_2O$. $Na_2O$ reduces the softening point of the glass compositions thereby increasing the formability in the glass. In embodiments, the concentration of $Na_2O$ in the glass composition may be greater than or equal to 0 mol %, greater than or equal to 2 mol %, or even greater than or equal to 4 mol %. In embodiments, the concentration of $Na_2O$ in the glass composition may be less than or equal to 25 mol %, less than or equal to 15 mol %, or even less than or equal to 10 mol %. In embodiments, the concentration of $Na_2O$ in the glass composition may be greater than or equal to 0 mol % and less than or equal to 25 mol %, greater than or equal to 0 mol % and less than or equal to 15 mol %, greater than or equal to 0 mol % and less than or equal to 10 mol %, greater than or equal to 2 mol % and less than or equal to 25 mol %, greater than or equal to 2 mol % and less than or equal to 15 mol %, greater than or equal to 2 mol % and less than or equal to 10 mol %, greater than or equal to 4 mol % and less than or equal to 25 mol %, greater than or equal to 4 mol % and less than or equal to 15 mol %, or even greater than or equal to 4 mol % and less than or equal to 10 mol %, or any and all sub-ranges formed from any of these endpoints. In embodiments, the glass composition may be free or substantially free of $Na_2O$.

In embodiments, the glass composition may comprise MgO. MgO lowers the viscosity of the glass compositions, which enhances the formability, the strain point, and the Young's modulus. In embodiments, the concentration of MgO in the glass composition may be greater than or equal to 0 mol % or even greater than or equal to 1 mol %. In embodiments, the concentration of MgO in the glass composition may be less than or equal to 5 mol % or even less than or equal to 3 mol %. In embodiments, the concentration of MgO in the glass composition may be greater than or equal to 0 mol % and less than or equal to 5 mol %, greater than or equal to 0 mol % and less than or equal to 3 mol %, greater than or equal to 1 mol % and less than or equal to 5 mol %, or even greater than or equal to 1 mol % and less than or equal to 3 mol %, or any and all sub-ranges formed from any of these endpoints. In embodiments, the glass composition may be free or substantially free of MgO.

In embodiments, the glass composition may comprise CaO. CaO lowers the viscosity of the glass compositions, which enhances the formability, the strain point and the Young's modulus. The incorporation of CaO may also facilitate separating the glass composition into a silica-rich phase and a calcium oxide-rich phase. In these embodiments, the silica-rich phase may be less susceptible to dissolution in water and/or an acidic solution than the calcium oxide-rich phase, which, in turn, facilitates the selective removal of the calcium oxide-rich phase and the formation of a porous microstructure in the glass container. In embodiments, the concentration of CaO in the glass composition may be greater than or equal to 0 mol %, greater than or equal to 10 mol %, or even greater than or equal to 20 mol %. In embodiments, the concentration of CaO in the glass composition may be less than or equal to 30 mol %, less than or equal to 28 mol %, or even less than or equal to 26 mol %. In embodiments, the concentration of CaO in the glass composition may be greater than or equal to 0 mol % and less than or equal to 30 mol %, greater than or equal to 0 mol % and less than or equal to 28 mol %, greater than or equal to 0 mol % and less than or equal to 26 mol %, greater than or equal to 10 mol % and less than or equal to 30 mol %, greater than or equal to 10 mol % and less than or equal to 28 mol %, greater than or equal to 10 mol % and less than or equal to 26 mol %, greater than or equal to 20 mol % and less than or equal to 30 mol %, greater than or equal to 20 mol % and less than or equal to 28 mol %, or even greater than or equal to 20 mol % and less than or equal to 26 mol %, or any and all sub-ranges formed from any of these endpoints. In embodiments, the glass composition may be free or substantially free of CaO.

In embodiments, the glass compositions may comprise $P_2O_5$. The incorporation of $P_2O_5$ may facilitate separating the glass composition into a silica-rich phase and a phosphorous oxide-rich phase. In these embodiments, the silica-rich phase may be less susceptible to dissolution in water and/or an acidic solution than the phosphorous oxide-rich phase, which, in turn, facilitates the selective removal of the phosphorous oxide-rich phase and the formation of a porous microstructure in the glass container. In embodiments, the concentration of $P_2O_5$ in glass composition may be greater than or equal to 0 mol %, greater than or equal to 10 mol %, or even greater than or equal to 25 mol %. In embodiments, the concentration of $P_2O_5$ in the glass composition may be less than or equal to 40 mol % or even less than or equal to 35 mol %. In embodiments, the concentration of $P_2O_5$ in the glass composition may be greater than or equal to 0 mol % and less than or equal to 40 mol %, greater than or equal to 0 mol % and less than or equal to 35 mol %, greater than or equal to 10 mol % and less than or equal to 40 mol %, greater than or equal to 10 mol % and less than or equal to 35 mol %, greater than or equal to 25 mol % and less than or equal to 40 mol %, or even greater than or equal to 25 mol % and less than or equal to 35 mol %, or any and all sub-ranges formed from any of these endpoints. In embodiments, the glass composition may be free or substantially free of $P_2O_5$.

In embodiments, the glass compositions may comprise $TiO_2$. $TiO_2$ present in the glass composition may separate with the silica to form a silica-rich and a titania-rich phase. In these embodiments, the silica-rich and titania-rich phase may be less susceptible to dissolution in water and/or an acidic solution than the boric oxide-rich phase and/or a calcium oxide-rich phase, which, in turn, facilitates the selective removal of the boric oxide-rich phase, and/or a calcium oxide-rich phase and the formation of a porous microstructure in the glass container. In embodiments, the concentration of $TiO_2$ in the glass composition may be greater than or equal to 0 mol %, greater than or equal to 10 mol %, or even greater than or equal to 15 mol %. In embodiments, the concentration of $TiO_2$ in the glass composition may be less than or equal to 30 mol % or even less than or equal to 25 mol %. In embodiments, the concentration of $TiO_2$ in the glass composition may be greater than or equal to 0 mol % and less than or equal to 30 mol %, greater than or equal to 0 mol % and less than or equal to 25 mol %, greater than or equal to 10 mol % and less than or equal to 30 mol %, greater than or equal to 10 mol % and less than or equal to 25 mol %, greater than or equal to 15 mol % and less than or equal to 30 mol %, or even greater than or equal to 15 mol % and less than or equal to 25 mol %, or any and all sub-ranges formed from any of these endpoints. In embodiments, the glass composition may be free or substantially free of $TiO_2$.

In embodiments, the glass compositions may include one or more fining agents. In embodiments, the fining agents may include, for example, $SnO_2$. In embodiments, the concentration of $SnO_2$ in the glass composition may be greater than or equal to 0 mol %, or even greater than or equal to 0.1 mol %. In embodiments, the concentration of $SnO_2$ may be less than or equal 0.5 mol %, or even less than or equal to 0.25 mol %. In embodiments, the concentration of $SnO_2$ may be greater than or equal to 0 mol % and less than or equal to 0.5 mol %, greater than or equal to 0 mol % and less than or equal to 0.25 mol %, greater than or equal to 0.1 mol % and less than or equal to 0.5 mol %, or even greater than or equal to 0.1 mol % and less than or equal to 0.25 mol %, or any and all sub-ranges formed from any of these endpoints. In embodiments, the glass composition may be free or substantially free of $SnO_2$.

Figure 3:
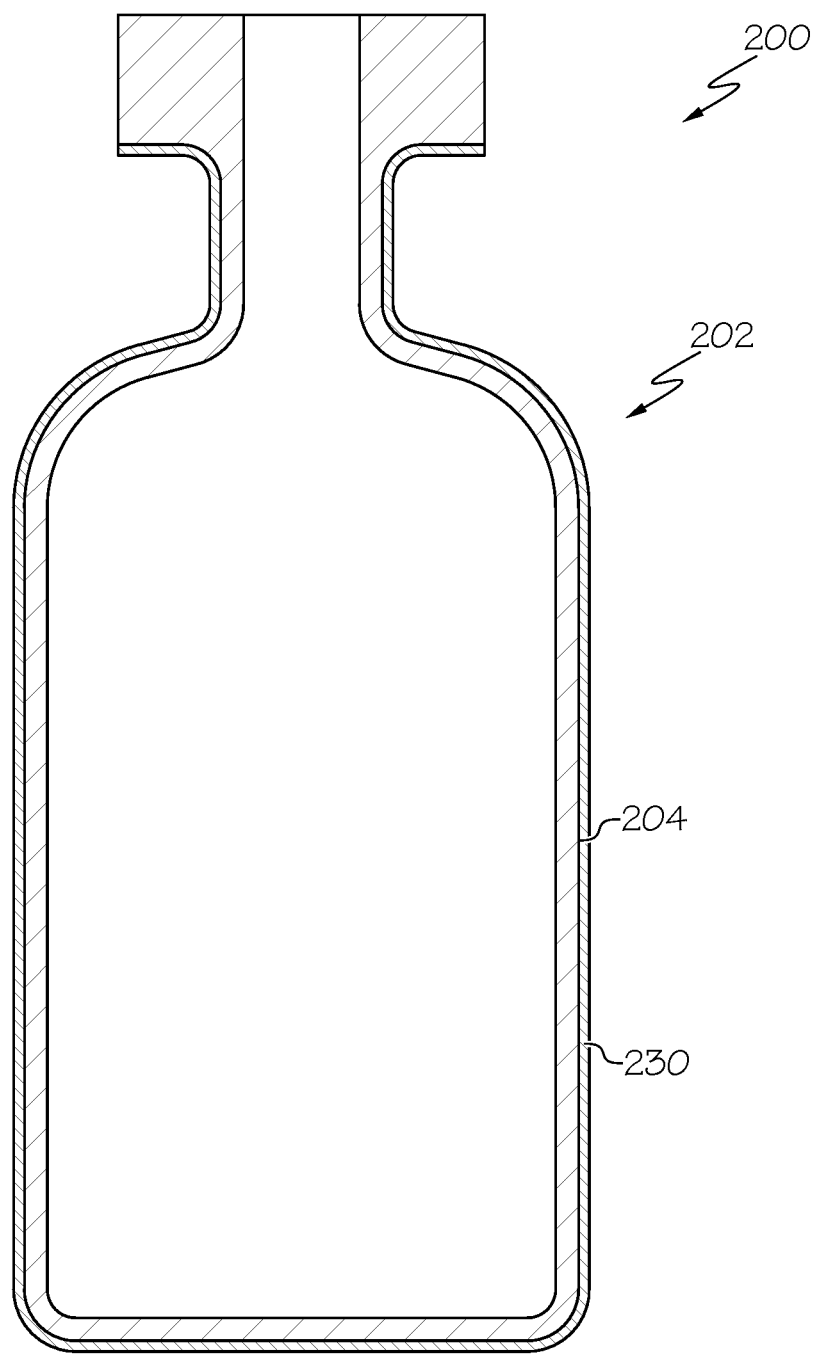
FIG. 3 is a schematic, cross-sectional view of a glass container with a coating, according to one or more embodiments shown and described herein.
Figure 4:
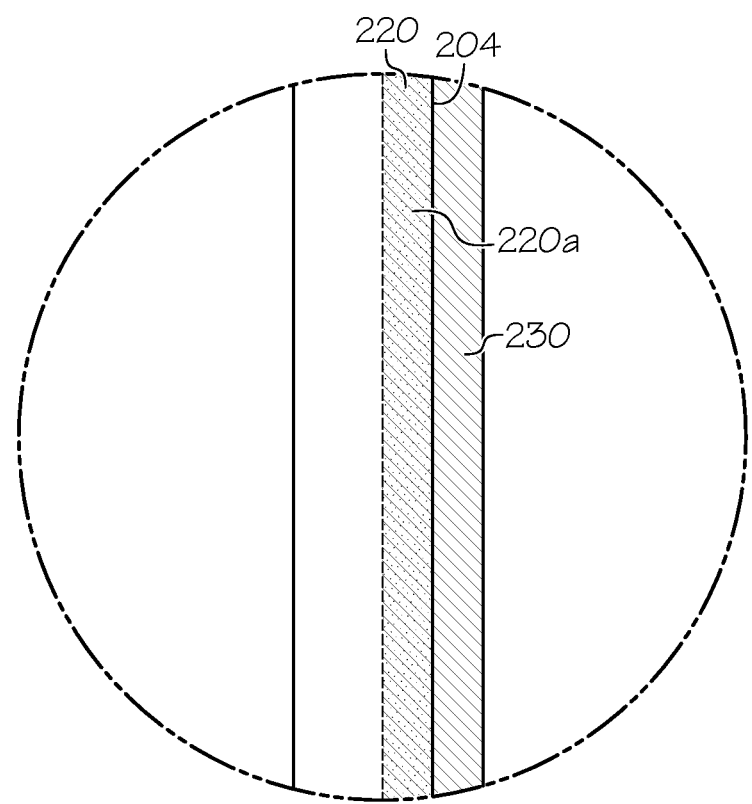
FIG. 4 is a schematic, cross-sectional, enlarged view of the glass container of FIG. 3, accordingly to one or more embodiments shown and described herein.

Referring now to FIGS. 3 and 4, in embodiments, the glass container may be a coated glass container 200 having a coating 230. In particular, the coating 230 may be a polymer. In embodiments, the polymer may be disposed in pores 220a of the external surface layer 220 of the glass body 202. In embodiments, the polymer may be disposed on the external surface 204 of the glass body 202. In embodiments, the coating may be a polymer as disclosed in U.S. Pat. No. 9,763,852, the entirety of which is incorporated by reference herein. For example, in embodiments, the polymer may be a thermally stable polymer or mixture of polymers, such as but not limited to, polyimides, polybenzimidazoles, polysulfones, polyetheretheketones, polyetherimides, polyamides, polyphenyls, polybenzothiazoles, polybenzoxazoles, polybisthiazoles, and polyaromatic heterocyclic polymers with and without organic or inorganic fillers. In embodiments, the polymer may be formed from other thermally stable polymers, such as polymers that do not degrade at temperatures in the range of from 200° C. to 400° C., including 250° C., 300° C., and 350° C. In embodiments, the coating 230 may be monomers and silanes that form polymers upon curing.

In embodiments, the coating 230 may have a thickness of less than or equal to 100 μm or even less than or equal to 1 μm. In embodiments, the coating 230 may have a thickness less than or equal to 100 nm, less than or equal to 90 nm, less than or equal to 80 nm, less than or equal to 70 nm, less than or equal to 60 nm, less than or equal to 50 nm, or even less than or equal to 25 nm. In embodiments, the coating 230 may not be of uniform thickness over the entirety of the coated glass container 200. For example, the coated glass container 200 may have a thicker coating 230 in some areas, due to the process of forming the coating 230. In embodiments, the coating 230 thickness may be varied over different regions of a coated glass container 200, which may promote protection in a selected region.

In embodiments, the coating 230 may have a coefficient of friction of less than or equal to 0.7 relative to a like-coated glass container, as determined with the vial-on-vial jig testing as described in U.S. Pat. No. 10,737,973, the entirety of which is incorporated by reference herein. In embodiments, the coefficient of friction may be less than or equal to 0.6, less than or equal to 0.5, less than or equal to 0.4, or even less than or equal to 0.3. Coated glass containers with coefficients of friction less than or equal to 0.7 generally exhibit improved resistance to frictive damage and, as a result, have improved mechanical properties. For example, conventional glass containers (without a coating 230 as described herein) may have a coefficient of friction greater than 0.7.

In embodiment, the coefficient of friction of the portion of the coated glass container 200 with the coating 230 is at least 20% less than a coefficient of friction of a surface of an uncoated glass contained formed from a same glass composition. For example, the coefficient of friction of the portion of the coated glass container 200 with the coating 230 may be at least 20% less, at least 25% less, at least 20% less, at least 40% less, or even at least 50% less than a coefficient of friction of a surface of an uncoated glass contained formed from a same glass composition.

A variety of processes may be used to form a glass container including, without limitation, fusion forming, slot draw, floating, rolling, and other glass-forming processes known to those in the art. Once the glass container has been formed, the glass container may be optionally shaped into a desired three-dimensional form, such as by vacuum molding or any other conventional glass shaping processes.

Once the glass container is formed and optionally shaped, the glass container is heat treated to induce phase separation, thereby producing an interconnected matrix of a first glass phase in which at least one second glass phase is dispersed. The heat treatment process generally includes heating the glass container to a heat treatment temperature and holding the glass container at the heat treatment temperature for a time period sufficient to induce the desired amount of phase separation in the glass container. In embodiments, the heat treatment temperature may be greater than or equal to 500° C. and less than or equal to 650° C., greater than or equal to 525° C. and less than or equal to 650° C., greater than or equal to 550° C. and less than or equal to 650° C., greater than or equal to 500° C. and less than or equal to 625° C., greater than or equal to 525° C. and less than or equal to 625° C., greater than or equal to 550° C. and less than or equal to 625° C., greater than or equal to 500° C. and less than or equal to 600° C., greater than or equal to 525° C. and less than or equal to 600° C., or even greater than or equal to 550° C. and less than or equal to 600° C., or any and all sub-ranges formed from any of these endpoints. In embodiments, the glass container may be held at the heat treatment temperature for a time period greater than or equal to 0.05 hour and less than or equal to 50 hours, greater than or equal to 0.1 hour and less than or equal to 50 hours, greater than or equal to 1 hour and less than or equal to 50 hours, greater than or equal to 4 hours and less than or equal to 50 hours, greater than or equal to 0.05 hour and less than or equal to 36 hours, greater than or equal to 0.1 hour and less than or equal to 36 hours, greater than or equal to 1 hour and less than or equal to 36 hours, greater than or equal to 4 hours and less than or equal to 36 hours, greater than or equal to 0.05 hour and less than or equal to 24 hours, greater than or equal to 0.1 hour and less than or equal to 24 hours, greater than or equal to 1 hour and less than or equal to 24 hours, greater than or equal to 4 hours and less than or equal to 24 hours, greater than or equal to 0.05 hour and less than or equal to 12 hours, greater than or equal to 0.1 hour and less than or equal to 12 hours, greater than or equal to 1 hour and less than or equal to 12 hours, or even greater than or equal to 4 hours and less than or equal to 12 hours, or any and all sub-ranges formed from any of these endpoints.

As described herein, it may be desirable to increase the surface area on the external surface of the glass container to facilitate adherence of a coating and reduce or eliminate cracking, flaking, and/or peeling of the coating. Accordingly, a glass container having a step porosity (i.e., the external surface layer has a porosity greater than a porosity of a remainder of the glass body extending from the external surface layer to the internal surface) may be formed. As such, in embodiments, following the heat treatment to induce phase separation in the glass container, the glass container is further processed to remove the at least one second glass phase from the interconnected matrix of the first glass phase to form a porous, interconnected matrix of the first glass phase in the glass container. In embodiments, the at least one second glass phase may be removed from the interconnected matrix of the first glass phase by etching the glass container. As noted hereinabove, in embodiments, the at least one second glass phase may have a greater dissolution rate in water, basic solutions, and/or acidic solutions than the first glass phase of the phase separated glass composition of the glass container, making the at least one second glass phase more susceptible to dissolution than the first glass phase.

In embodiments, etching the glass container includes contacting the external surface of the glass body with a first etchant and preventing contact between the internal surface of the glass body and the etchant to produce the glass container having the step porosity. In embodiments, the porosity and/or pore size is not uniform after etching, which may help facilitate the partial consolidation in at least a remainder of the glass body. For example, in embodiments, after etching, the external surface layer of the glass body may have a porosity greater than or equal to 30% and less than or equal to 50% and the porosity may decrease from the external surface to the internal surface. In embodiments, the penetration depth of the etchant defines the thickness of the external surface layer.

The glass container is contacted with the etchant at a temperature and for a period of time sufficient to substantially remove all of the at least one second glass phase from the interconnected matrix of the first glass phase in the glass cladding layers 104a, 104b, thereby leaving a porous, interconnected matrix of the first glass phase.

In embodiments, the contacting with the first etchant may be conducted at a temperature greater than or equal to 20° C. and less than or equal to 125° C. and for a time period greater than or equal to 0.1 hour and less than or equal to 1 hour. In embodiments, the contacting with the first etchant may be conducted at a temperature greater than or equal to 20° C. and less than or equal to 125° C., greater than or equal to 40° C. and less than or equal to 120° C., greater than or equal to 60° C. and less than or equal to 115° C., or even greater than or equal to 80° C. and less than or equal to 110° C., or any and all sub-ranges formed from any of these endpoints. In embodiments, the contacting with the first etchant may be conducted for a time period greater than or equal to 0.1 hour and less than or equal to 1 hour, or even greater than or equal to 0.5 hour and less than or equal to 0.75 hour, or any and all sub-ranges formed from any of these endpoints.

In embodiments, the process for making a glass container having step porosity may further include contacting the external surface of the glass body with a second etchant. In embodiments, the contacting with the second etchant may be conducted at a temperature greater than or equal to 75° C. and less than or equal to 125° C. and for a time period greater than or equal to 16 hours and less than or equal to 48 hours. In embodiments, the contacting with the second etchant may be conducted at a temperature greater than or equal to 75° C. and less than or equal to 125° C., greater than or equal to 80° C. and less than or equal to 120° C., greater than or equal to 85° C. and less than or equal to 115° C., or even greater than or equal to 90° C. and less than or equal to 110° C., or any and all sub-ranges formed from any of these endpoints. In embodiments, the contacting with the second etchant may be conducted for a time period greater than or equal to 16 hours and less than or equal to 48 hours, greater than or equal to 20 hours and less than or equal to 44 hours, greater than or equal to 24 hours and less than or equal to 40 hours, or even greater than or equal to 28 hours and less than or equal to 36 hours, or any and all sub-ranges formed from any of these endpoints.

In embodiments, the process for making a glass container having step porosity may further include rinsing the etched glass container in a solution at a temperature greater than or equal to 75° C. and less than or equal to 125° C. and for a time period greater than or equal to 12 hours and less than or equal to 24 hours and rinsing the etched glass container in water at a temperature greater than or equal to 75° C. and less than or equal to 125° C. and for a time period greater than or equal to 12 hours and less than or equal to 24 hours. In embodiments, the solution may be a mineral acid, a weak acid, or combination thereof. In embodiments, the mineral acid may comprise HCl, $HNO_3$, or combinations thereof. In embodiments, the weak acid may comprise citric acid solution (e.g., 0.1 M), tartaric acid, ascorbic acid, EDTA, methane-sulfonic acid, toluenesulfonic acid), or combinations thereof.

In embodiments, the first etchant and/or the second etchant may be a substantially fluoride-free aqueous acidic treating medium as disclosed in U.S. Pat. No. 8,978,414, the entirety of which is incorporated by reference herein. The phrase "substantially fluoride-free" means that the medium comprises less than or equal to about 0.15 wt % (i.e., 1500 ppm) of fluoride ions based on the total weight of the medium. Thus, in embodiments, the aqueous acidic treating medium has no fluoride ions. In embodiments, a source of fluoride ions (e.g., from HF, NaF, $NH_4HF_2$, or the like) will be present. For example, in embodiments, the substantially fluoride-free aqueous acid treating medium will include up to about 0.1 wt % of fluoride ions. In embodiments, the substantially-fluoride free aqueous acid treating medium may include about 0.001 to about 0.095 wt % of fluoride ions. In embodiments, the substantially-fluoride free aqueous acid treating medium may be used to alter the pore size and/or porosity of the glass container.

A variety of acidic compounds may be used, either alone or in combination, to formulate the substantially fluoride-free aqueous treating media. In embodiments, the aqueous acidic treating medium may comprise a mineral or organic acid including chelating organic acids, such as an aqueous solution of the acid. Illustrative examples of such acids include HCl, HBr, $HNO_3$, $H_2SO_4$, $H_2SO_3$, $H_3PO_4$, $H_3PO_2$, HOAc, citric acid, tartaric acid, ascorbic acid, EDTA, methane-sulfonic acid, toluenesulfonic acid, and combinations thereof. In embodiments, a mineral acid used to etch the at least one second glass phase.

As described herein, it may be desirable to at least partially consolidate a remainder of the glass container, including fully consolidating an internal surface thereof, to form an inert, chemically durable pharmaceutical package while also ensuring a sufficient porosity of the external surface to facilitate adherence of a coating thereto.

Accordingly, in embodiments, the process for making a glass container having step porosity may further include heating the etched container (e.g., according to a thermal consolidation schedule) to at least partially consolidate pores in at least the remainder of the glass body. As described herein, in embodiments, the pore size of the glass container is not uniform throughout the etched glass body. The variation in pore sizes between the external surface layer and the remainder of the glass body may facilitate partial consolidation in at least a remainder of the glass body without partially or full consolidating the external surface layer. In embodiments, the heating the etched glass container comprises heating the etched glass container at a first average heating rate greater than or equal to 50° C./hour and less than or equal to 150° C./hour to a first temperature range greater than or equal to 200° C. and less than or equal to 300° C.; heating the etched glass container at a second average heating rate greater than or equal to 150° C./hour and less than or equal to 250° C./hour to a second temperature range greater than or equal to 1150° C. and less than or equal to 1300° C.; holding the etched glass container at the second temperature range for a time period greater than or equal to 0.1 hour and less than or equal to 0.5 hour such that the pores in at least the remainder of the glass body are at least partially consolidated; and cooling the partially consolidated glass container to room temperature.

In addition to or as an alternative to a thermal consolidation schedule, in embodiments, the pores in the external surface layer of the glass body may be masked prior to the heating of the etched glass container to ensure that the pores remain in the external surface while the remainder of the glass container is consolidated. In embodiments, the pores in the external surface layer of the glass body are masked with graphite, poly(vinyl chloride), poly(vinyl alcohol), poly(vinyl pyrrolidone), alkali halide salts, or a combination thereof. In embodiments, poly(vinyl chloride), poly(vinyl alcohol), poly(vinyl pyrrolidone), or alkali halide salts are dissolved to saturation in a solvent (e.g., water, isopropanol, ethanol, or combinations thereof) prior to being applied to the external surface layer and precipitate out when contacted with the external surface layer. In embodiments, the penetration depth of poly(vinyl chloride), poly(vinyl alcohol), and/or poly(vinyl pyrrolidone) may be limited by the solvent viscosity. In embodiments, the penetration depth of an alkali halide salt may be limited by the nucleation and growth rates of the salt. In embodiments in which the pores are masked with graphite, poly(vinyl chloride), poly(vinyl alcohol), and/or poly(vinyl pyrrolidone), upon exposure to oxygen at elevated temperatures (such as the consolidation temperatures), the graphite, poly(vinyl chloride), poly(vinyl alcohol), and/or poly(vinyl pyrrolidone) will rapidly oxidize and be removed from the pores in the external surface layer of the glass body. In embodiments in which the pores are masked with alkali halide salts, the salts are removed from the pores in the external surface layer of the glass body via aqueous dissolution.

In embodiments, after the glass container is etched and consolidated, the glass container may be coated with a coating, as described herein. Because the glass containers have a step porosity formed by the etching and consolidation steps described herein, the surface area on the external surface of the glass container is increased to facilitate adherence of a coating thereto and reduce or eliminate cracking, flaking, and/or peeling of the coating. A variety of techniques may be used to fill or coat the glass container including, without limitation, dip coating, flow coating, vacuum coating, or the like.

Examples

In order that various embodiments be more readily understood, reference is made to the following examples, which illustrate various embodiments of the porous glass containers described herein.

Table 1 shows example glass compositions 1-16 (in terms of mol %) that may be used to form the glass containers described herein.

TABLE 1

| Example | 1 | 2 | 3 | 5 | 6 | 7 |
|---|---|---|---|---|---|---|
| $SiO_2$ | 65.0 | 63.0 | 61.9 | 67.9 | 66.6 | 72.6 |
| $B_2O_3$ | 25.6 | 30.2 | 29.6 | 26.2 | 25.8 | 22.3 |
| $Al_2O_3$ | 1.6 | 0 | 1.8 | 0 | 1.8 | 0 |
| $Na_2O$ | 7.7 | 6.8 | 6.7 | 5.9 | 5.8 | 5.0 |
| MgO | 0 | 0 | 0 | 0 | 0 | 0 |
| CaO | 0 | 0 | 0 | 0 | 0 | 0 |
| $SnO_2$ | 0 | 0 | 0 | 0 | 0 | 0 |
| $P_2O_5$ | 0 | 0 | 0 | 0 | 0 | 0 |
| $TiO_2$ | 0 | 0 | 0 | 0 | 0 | 0 |

| Example | 8 | 9 | 10 | 11 | 12 | 13 |
|---|---|---|---|---|---|---|
| $SiO_2$ | 77.3 | 75.9 | 50.0 | 60.0 | 70.0 | 26.0 |
| $B_2O_3$ | 18.5 | 18.2 | 0 | 0 | 0 | 5.0 |
| $Al_2O_3$ | 0 | 1.8 | 0 | 0 | 0 | 10.0 |
| $Na_2O$ | 4.2 | 4.1 | 15.0 | 10.0 | 25.0 | 0 |
| MgO | 0 | 0 | 0 | 0 | 0 | 5.0 |
| CaO | 0 | 0 | 0 | 0 | 0 | 28.0 |
| $SnO_2$ | 0 | 0 | 0.1 | 0.1 | 0.1 | 0.1 |
| $P_2O_5$ | 0 | 0 | 35.0 | 30.0 | 5.0 | 0 |
| $TiO_2$ | 0 | 0 | 0 | 0 | 0 | 26.0 |

| Example | 14 | 15 | 16 |
|---|---|---|---|
| $SiO_2$ | 26.0 | 34.0 | 31.0 |
| $B_2O_3$ | 5.0 | 7.0 | 7.5 |
| $Al_2O_3$ | 16.0 | 13.0 | 12.5 |
| $Na_2O$ | 2.5 | 0 | 0 |
| MgO | 0 | 5.0 | 1.5 |
| CaO | 24.5 | 24.0 | 22.5 |
| $SnO_2$ | 0.1 | 0.1 | 0.1 |
| $P_2O_5$ | 0 | 0 | 0 |
| $TiO_2$ | 26.0 | 17.0 | 25.0 |

The glass compositions may be used to form the glass containers described herein because they are phase separable upon heat treatment. For example, example glass compositions 1-9 may separate into a silica-rich phase and a boric oxide-rich phase. Example glass compositions 10-12 may separate into a silica-rich phase and a phosphorous oxide-rich phase. Example glass compositions 13-15 may separate into a silica-rich and titania-rich phase and a calcium oxide-rich and a boric oxide-rich phase.

Figure 5:
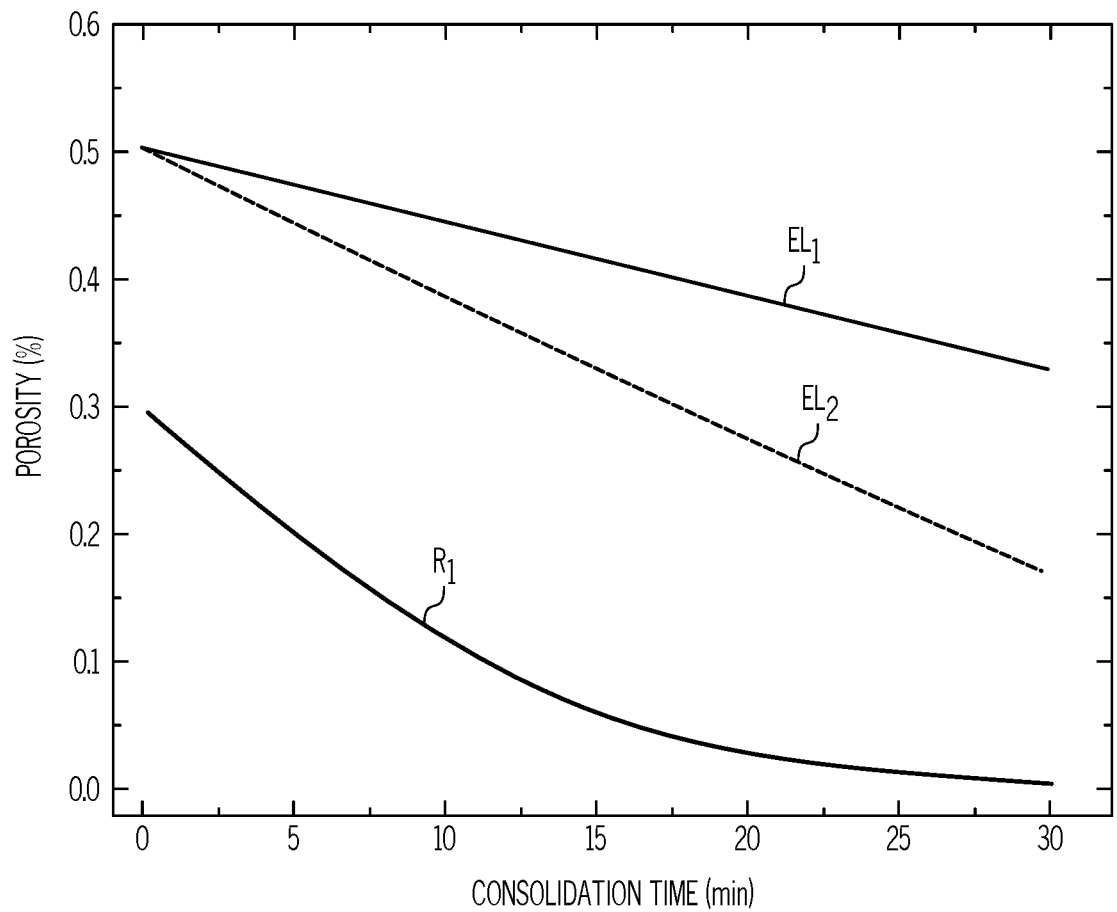
FIG. 5 is a plot of consolidation time versus porosity (x-axis: consolidation time; y-axis: porosity) of a glass container, according to one or more embodiments shown and described herein.

Referring now to FIG. 5, a first glass container and a second glass container having a thickness of 1 mm were formed from example glass composition 1. The glass containers were heat treated in an oven at 580° C. for 3 hours to induce phase separation into a silica-rich phase and a boric oxide-rich phase. Following heat treatment to induce phase separation, the glass containers were etched with an etchant including ammonium bifluoride (0.26 M) and citric acid (1 M) at 25° C. for 1.5 hours to produce glass containers having an etched surface layer. The glass containers were then etched with HCl (1 M) at 95° C. for 24 hours to remove the boric oxide-rich phase and produce glass containers having step porosity. As shown in FIG. 5, the external surface layer $EL_1$ of the first glass container (i.e., the layer extending from the external surface to 100 nm into the thickness of glass container) had a porosity of 50% and a pore size of 20 nm. The remainder $R_1$ of the first glass container has a porosity of 30%±0.03 and a pore size of 5 nm. The external surface $EL_2$ of the second glass container had a porosity of 50% and a pore size of 10 nm.

The etched glass containers were subjected to the following thermal consolidation schedule in a furnace: heated from room temperature to 250° C. at a rate of 100° C./hour; heated from 250° C. to 1225° C. at a rate of 200° C./hour; held at 1225° C./hour for 20 minutes; and cooled from 1225° C. to room temperature at a furnace rate. After being subjected to the thermal consolidation schedule, the external surface layer $EL_1$ of the first glass container had a porosity of 33% and a pore size of 13 nm. The remainder $R_1$ of the first glass container had a porosity of 0% and a pore size of 0 nm. The external surface layer $EL_2$ of the second glass container had a porosity of 17% and a pore size of 3.5 nm. As indicated by FIG. 5, the glass containers described herein may be subjected to a specific thermal consolidation schedule to achieve a consolidated internal surface and a desired porosity and pore size on the external surface layer to facilitate adherence of a coating thereto.

Figure 6:
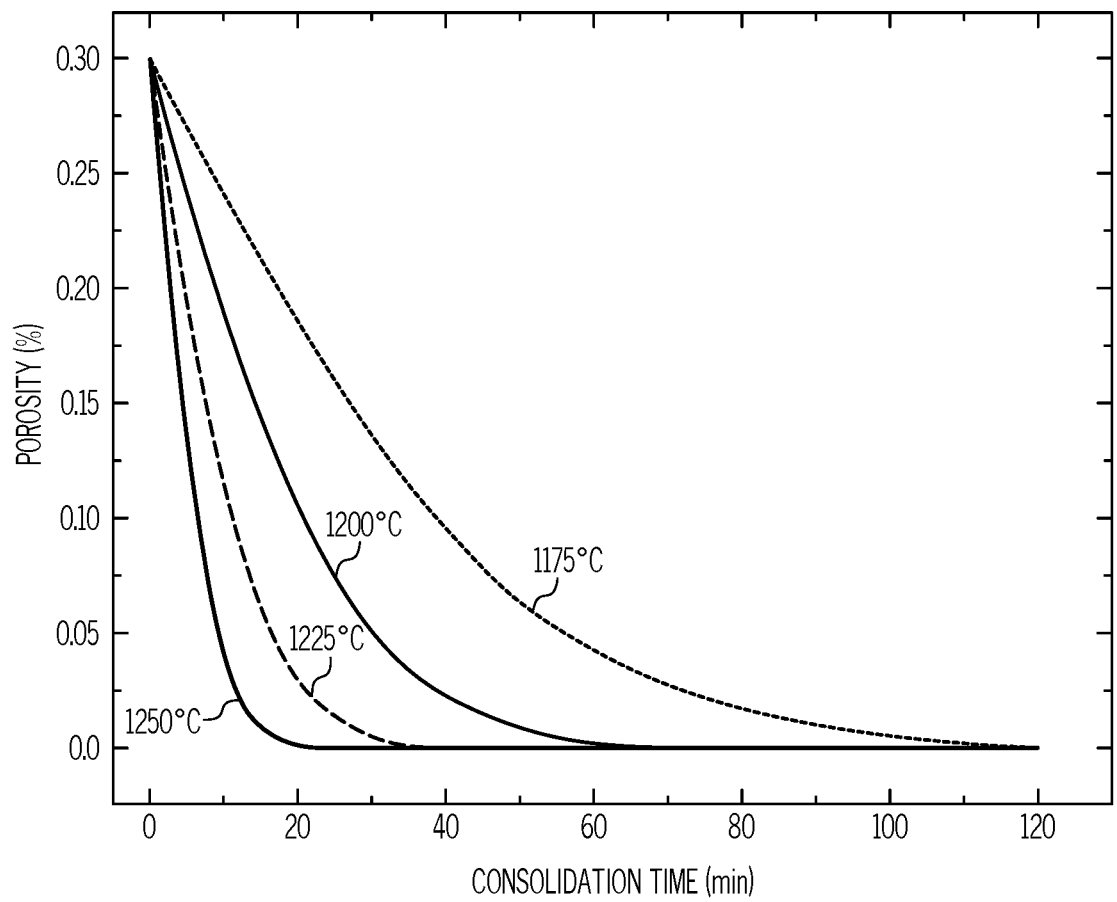
FIG. 6 is a plot of consolidation time versus porosity (x-axis: consolidation time; y-axis: porosity) of a remainder of a glass container, according to one or more embodiments shown and described herein.
Figure 7:
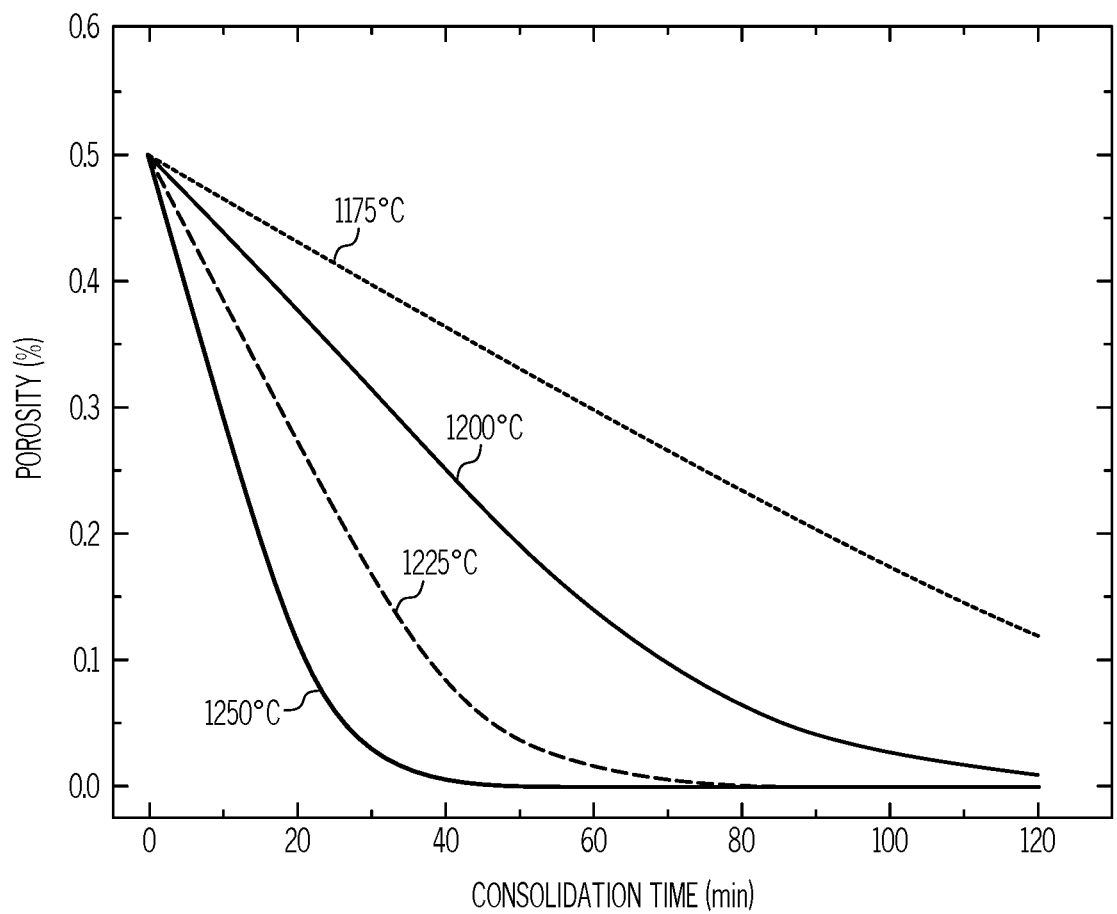
FIG. 7 is a plot of consolidation time versus porosity (x-axis: consolidation time; y-axis: porosity) of an external surface layer of a glass container, according to one or more embodiments shown and described herein.
Figure 8:
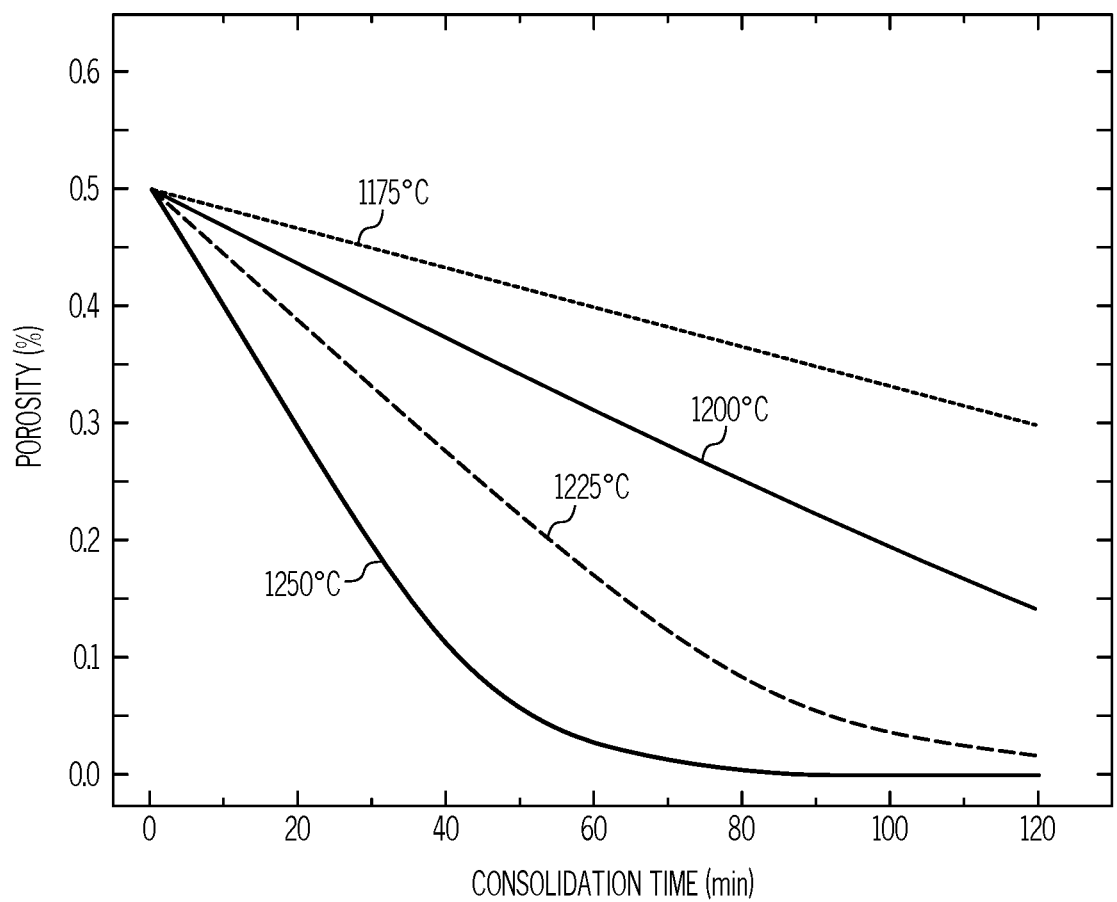
FIG. 8 is a plot of consolidation time versus porosity (x-axis: consolidation time; y-axis: porosity) of an external surface layer of a glass container, according to one or more embodiments shown and described herein.

Referring now to FIGS. 6-8, the glass containers described with respect to FIG. 5 were subjected to the same thermal consolidation schedule, except with the hold temperatures as indicated on the plots. FIG. 6 shows the porosity of the remainder of the first glass container, FIG. 7 shows the porosity of the second glass container with the external surface layer having a pore size of 10 nm before being subjected to the thermal consolidation schedule, and FIG. 8 shows the porosity of the first glass container with the external surface layer having a porosity of 20 nm before being subjected to the thermal consolidation schedule. As indicated by FIGS. 6-8, the glass containers described herein may be subjected to a specific thermal consolidation schedule to achieve a consolidated internal surface and a desired porosity on the external surface layer to facilitate adherence of a coating thereto.

It will be apparent to those skilled in the art that various modifications and variations may be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of forming a glass container having a step porosity, the method comprising:
   providing a glass container having a glass body comprising an external surface, an internal surface opposite the external surface, a thickness T extending between the external surface and the internal surface, and an external surface layer extending from the external surface into the thickness of the glass body;
   contacting the external surface of the glass body with a first etchant and preventing contact between the internal surface of the glass body and the first etchant to produce the glass container having the step porosity, wherein the external surface layer has a porosity greater than a porosity of a remainder of the glass body extending from the external surface layer to the internal surface.

2. The method of claim 1, wherein the method further comprises heating the etched glass container to at least partially consolidate pores in at least the remainder of the glass body.

3. The method of claim 2, wherein the heating the etched glass container comprises:
- heating the etched glass container at a first average heating rate greater than or equal to 50° C./hour and less than or equal to 150° C./hour to a first temperature range greater than or equal to 200° C. and less than or equal to 300° C.;
- heating the etched glass container at a second average heating rate greater than or equal to 150° C./hour and less than or equal to 250° C./hour to a second temperature range greater than or equal to 1150° C. and less than or equal to 1300° C.;
- holding the etched glass container at the second temperature range for a time period greater than or equal to 0.1 hour and less than or equal to 0.5 hour such that the pores in at least the remainder of the glass body are at least partially consolidated; and
- cooling the partially consolidated glass container to room temperature.

4. The method of claim 2, wherein pores in the external surface layer of the glass body are masked prior to the heating the etched glass container.

5. The method of claim 2, wherein the method further includes coating the partially consolidated glass container with a coating, the coating having a coefficient of friction less than or equal to 0.7.

6. The method of claim 1, wherein the glass container is formed from an alkali borosilicate glass composition.

7. The method of claim 6, wherein the method further comprises, prior to the contacting with the first etchant, heating the glass container to separate the alkali borosilicate glass composition into a boric oxide-rich phase and a silica-rich phase.

8. The method of claim 1, wherein the contacting with the first etchant is conducted at a temperature greater than or equal to 20° C. and less than or equal to 125° C. and for a time period greater than or equal to 0.1 hour and less than or equal to 1 hour.

9. The method of claim 1, wherein the method further includes contacting the external surface of the glass body with a second etchant at a temperature greater than or equal to 75° C. and less than or equal to 125° C. and for a time period greater than or equal to 16 hours and less than or equal to 48 hours.

10. The method of claim 1, wherein the method further includes rinsing the etched glass container in a solution at a temperature greater than or equal to 75° C. and less than or equal to 125° C. and for a time period greater than or equal to 12 hours and less than or equal to 24 hours and rinsing the etched glass container in water at a temperature greater than or equal to 75° C. and less than or equal to 125° C. and for a time period greater than or equal to 12 hours and less than or equal to 24 hours.

* * * * *